(12) United States Patent
Hotta et al.

(10) Patent No.: US 12,318,984 B2
(45) Date of Patent: Jun. 3, 2025

(54) CONTROLLER OF INJECTION MOLDING MACHINE AND METHOD OF CONTROLLING INJECTION MOLDING MACHINE

(71) Applicant: SUMITOMO HEAVY INDUSTRIES, LTD., Tokyo (JP)

(72) Inventors: Daigo Hotta, Chiba (JP); Yutaka Tsutsumi, Chiba (JP); Shun Shibuya, Chiba (JP); Yuki Matsui, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 286 days.

(21) Appl. No.: 18/062,210

(22) Filed: Dec. 6, 2022

(65) Prior Publication Data

US 2023/0173728 A1 Jun. 8, 2023

(30) Foreign Application Priority Data

Dec. 7, 2021 (JP) .................. 2021-198326

(51) Int. Cl.
*B29C 45/77* (2006.01)
*B29C 45/76* (2006.01)

(52) U.S. Cl.
CPC ............ *B29C 45/77* (2013.01); *B29C 45/766* (2013.01); *B29C 2945/76006* (2013.01); *B29C 2945/7604* (2013.01); *B29C 2945/7611* (2013.01); *B29C 2945/76254* (2013.01); *B29C 2945/76381* (2013.01); *B29C 2945/76498* (2013.01); *B29C 2945/76688* (2013.01); *B29C 2945/76859* (2013.01); *B29C 2945/76936* (2013.01)

(58) Field of Classification Search
CPC ........ B29C 45/76; B29C 45/766; B29C 45/77
See application file for complete search history.

(56) References Cited

U.S. PATENT DOCUMENTS

2011/0210461 A1   9/2011   Kariya et al.

FOREIGN PATENT DOCUMENTS

| CN | 103402732 | 11/2013 |
|---|---|---|
| JP | H1-316241 | 12/1989 |
| JP | H3-189060 | 8/1991 |
| JP | H08-164545 | 6/1996 |
| JP | H9-123242 | 5/1997 |
| JP | 2006-7226 | 1/2006 |
| JP | 2014-69219 | 4/2014 |
| JP | 2020-116767 | 8/2020 |

*Primary Examiner* — James Sanders
(74) *Attorney, Agent, or Firm* — IPUSA, PLLC

(57) ABSTRACT

With respect to a controller of an injection molding machine, the injection molding machine includes an injection member provided inside a cylinder to heat a molding material and an injection drive source to fill the molding material into a mold device by moving the injection member forward. The controller includes a limiting part that limits a movement of the injection member forward in a pressure-holding process of controlling an injection drive source so that an actual value of a filling pressure acting on the molding material from the injection member becomes a set value, and a determining part that determines an appropriateness of a setting to be used by the limiting part based on information of a sensor provided in the mold device.

9 Claims, 6 Drawing Sheets

CONTROLLER OF INJECTION MOLDING MACHINE AND METHOD OF CONTROLLING INJECTION MOLDING MACHINE

CROSS-REFERENCE TO RELATED APPLICATIONS

The present application is based on and claims priority of Patent Application No. 2021-198326 filed on Dec. 7, 2021 with the Japan Patent Office, the entire contents of Japanese Patent Application No. 2021-198326 are hereby incorporated by reference.

BACKGROUND OF THE INVENTION

1. Field of the Invention

The present invention relates to a controller of injection molding machine and a method of controlling the injection molding machine.

2. Description of the Related Art

The injection molding machine in a conventional technique is equipped with a mold and an injection device. The mold has a movable mold and a fixed mold, and a cavity is formed by these movable and fixed molds. The injection device includes a heating cylinder and a screw located in the heating cylinder. By moving the screw forward, a molten resin in the heating cylinder fills the cavity. The control system of the injection molding machine of the conventional technique controls the driving part of the injection device based on the difference between the command value of the screw position and the detection value.

SUMMARY OF THE INVENTION

Problems to be Solved by the Invention

An injection molding machine includes a cylinder to heat a molding material, an injection member provided inside the cylinder, an injection drive source to fill the molding material inside the mold device by moving the injection member forward, and a controller to control the injection drive source. The controller performs a filling process and a pressure-holding process in this order. The filling process is a process of filling the mold material into the mold device by controlling the injection drive source so that the actual value of the moving velocity of the injection member reaches the set value. The pressure-holding process is a process in which the injection drive source is controlled so that the actual value of a filling pressure acting on the molding material from the injection member reaches the set value, thereby replenishing the shortage of the molding material due to cooling shrinkage in the mold device.

The controller monitors the forward velocity of the injection member during the pressure-holding process and controls the injection drive source so that the forward velocity does not exceed the upper limit. Thus, gas burn can be suppressed. Gas burn is a phenomenon in which the molding material flows into the cavity space in the mold device, compressing and heating the gas in the cavity space and carbonizing the molding material. Traditionally, in the pressure-holding process, a skilled user sets the movement limit of an injection member forward based on the user's experience, and it is difficult for a non-skilled user to set the movement limit of an injection member forward.

One aspect of the invention provides a technique to assist in setting a forward limit of an injection member in a pressure-holding process.

Another aspect of the invention provides a technique for suppressing gas burn.

Means for Solving the Problems

A controller of an injection molding machine according to one embodiment of the present invention includes: an injection member provided inside a cylinder to heat a molding material; and an injection drive source to fill the molding material into a mold device by moving the injection member forward. The controller includes: a limiting part that limits a movement of the injection member forward in a pressure-holding process of controlling an injection drive source so that an actual value of a filling pressure acting on the molding material from the injection member becomes a set value; and a determining part that determines an appropriateness of a setting to be used by the limiting part based on information of a sensor provided in the mold device.

A controller of an injection molding machine according to another embodiment of the present invention includes: an injection member provided inside a cylinder to heat a molding material; and an injection drive source to fill the molding material into the mold device by moving the injection member forward. The controller includes a limiting part that limits a forward acceleration of the injection member in a pressure-holding process in which the injection drive source is controlled so that an actual value of a filling pressure acting on the molding material from the injection member becomes a set value.

Effects of the Invention

According to one aspect of the present invention, the setting can be assisted by determining the appropriateness of the setting to be used by the limiting part based on the information of the sensor provided in a mold device.

According to another aspect of the present invention, by limiting a forward acceleration of an injection member, a compression of gas can be suppressed and the gas burn can be suppressed.

DETAILED DESCRIPTION OF THE INVENTION

Figure 1:
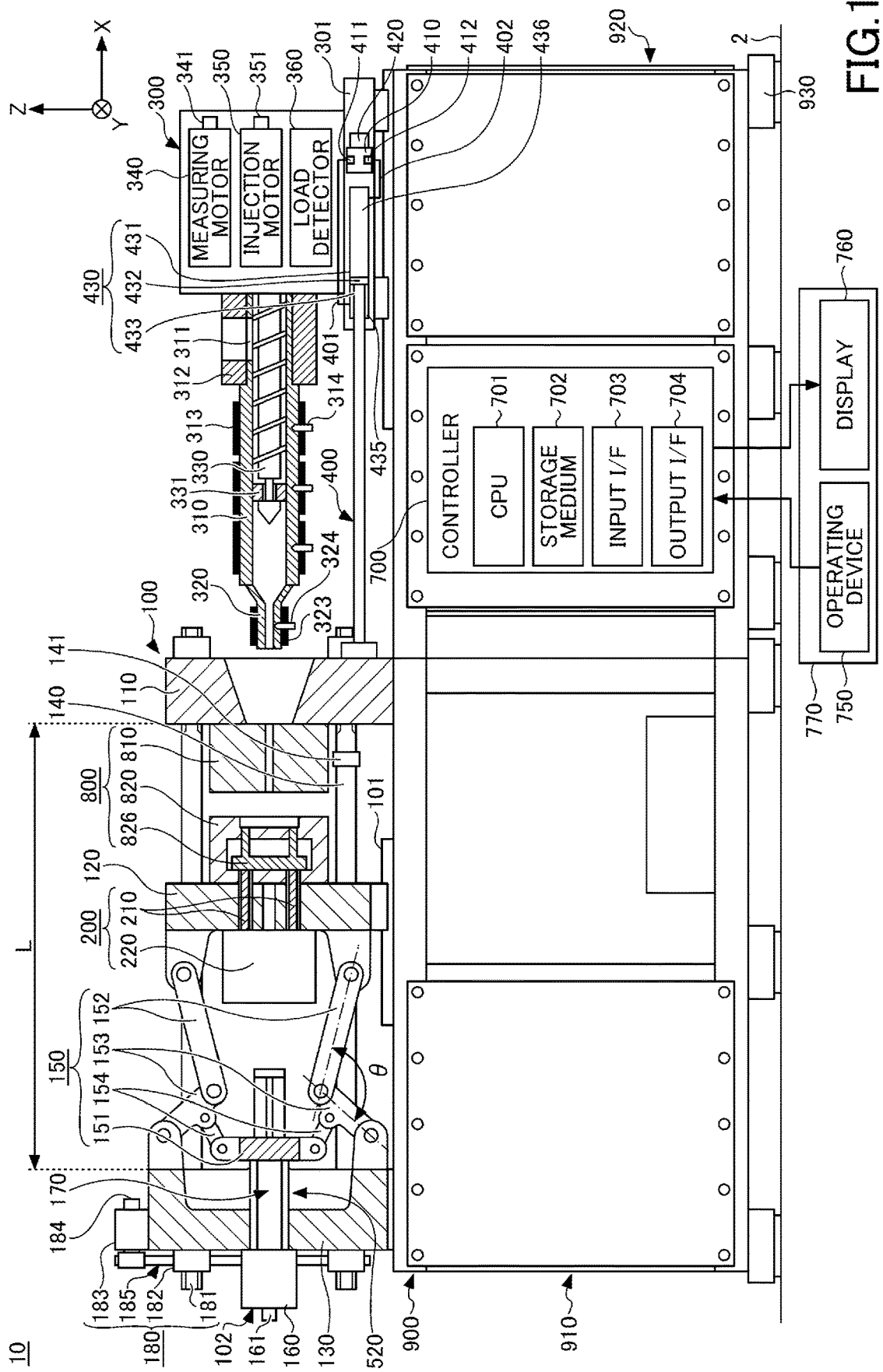
FIG. 1 is a view illustrating a state when a mold opening of an injection molding machine according to an embodiment is completed.

Hereinafter, an embodiment of the invention will be described with reference to drawings. In each drawing, the same or corresponding reference numerals are assigned to the same or corresponding configurations, and descriptions thereof are omitted.

(Injection Molding Machine)

Figure 2:
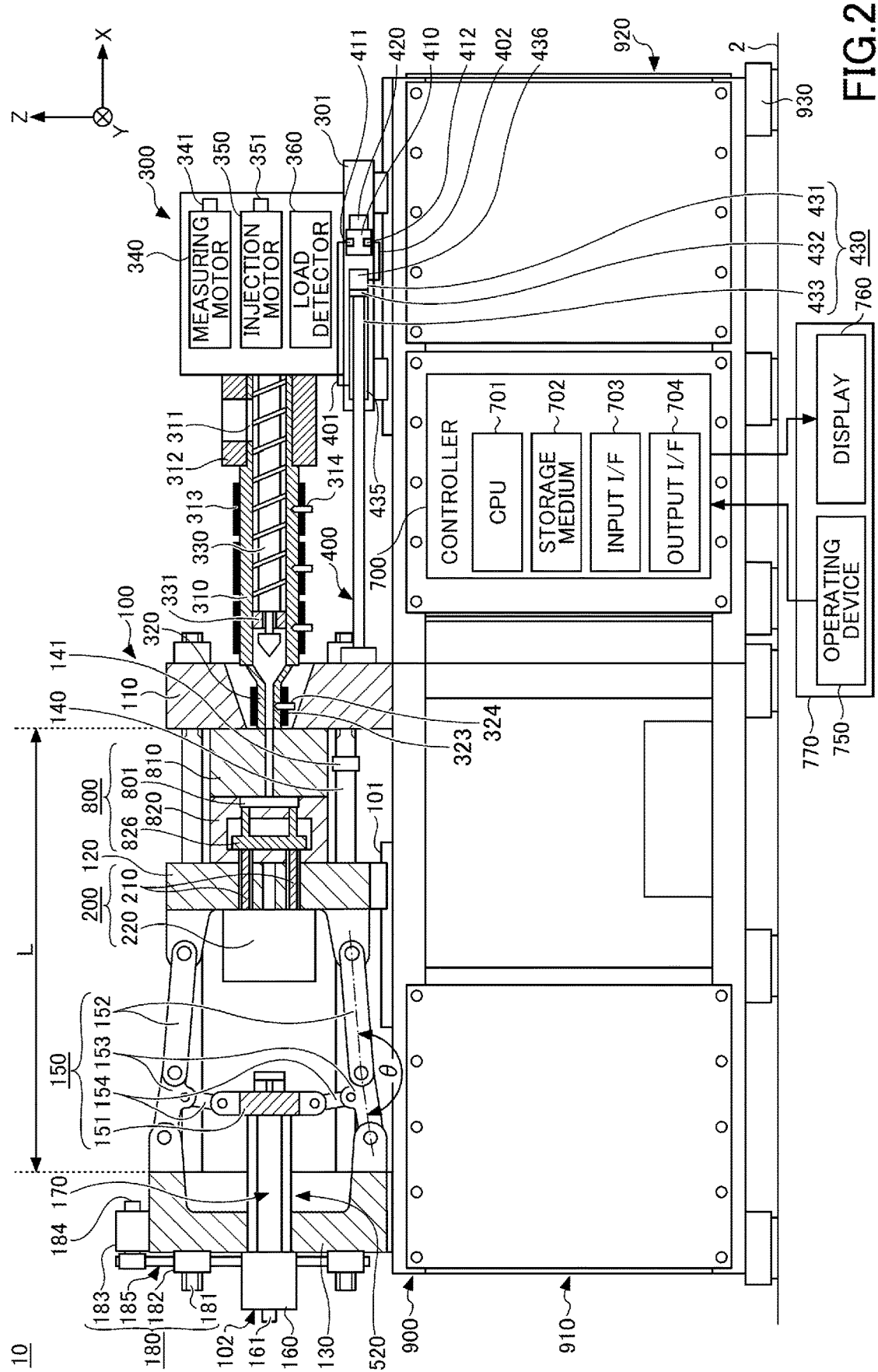
FIG. 2 is a view illustrating a state when a mold of the injection molding machine according to the embodiment is clamped.

FIG. 1 is a view illustrating a state when a mold opening of an injection molding machine according to an embodiment is completed. FIG. 2 is a view illustrating a state when a mold of the injection molding machine according to the embodiment is clamped. In this specification, an X-axis direction, a Y-axis direction, and a Z-axis direction are directions perpendicular to each other. The X-axis direction and the Y-axis direction represent a horizontal direction, and the Z-axis direction represents a vertical direction. When a mold clamping device 100 is a horizontal type, the X-axis direction is a mold opening and closing direction and the Y-axis direction is a width direction of an injection molding machine 10. A negative side in the Y-axis direction is referred to as an operation side, and a positive side in the Y-axis direction is referred to as a non-operation side.

As illustrated in FIGS. 1 and 2, the injection molding machine 10 includes a mold clamping device 100 that opens and closes a mold device 800, an ejector device 200 that ejects a molded article molded by the mold device 800, an injection device 300 that injects a molding material into the mold device 800, a moving device 400 that moves the injection device 300 forward and backward against the mold device 800, a controller 700 that controls each component of the injection molding machine 10, and a frame 900 that supports each component of the injection molding machine 10. The frame 900 includes a mold clamping device frame 910 supporting the mold clamping device 100 and an injection device frame 920 supporting the injection device 300. The mold clamping device frame 910 and the injection device frame 920 are respectively installed on the floor 2 via a leveling adjuster 930. The controller 700 is placed in the internal space of the injector device frame 920. Each component of the injection molding machine 10 is described below.

(Mold Clamping Device)

In descriptions of the mold clamping device 100, a movement direction (for example, X-axis positive direction) of a movable platen 120 at the time of mold closing is defined as a front side, and a movement direction (for example, X-axis negative direction) of the movable platen 120 at the time of mold opening is defined as a rear side.

The mold clamping device 100 performs mold closing, pressure-boosting, mold clamping, depressurizing, and mold opening of a mold device 800. The mold device 800 includes a fixed mold 810 and a movable mold 820.

The mold clamping device 100 is horizontal, for example, and the mold opening and closing direction is horizontal. The mold clamping device 100 has a fixed platen 110 to which a fixed mold 810 is attached, the movable platen 120 to which the movable mold 820 is attached, and a moving mechanism 102 for moving the movable platen 120 in the mold opening and closing direction relative to the fixed platen 110.

The fixed platen 110 is fixed to the mold clamping device frame 910. The fixed mold 810 is attached to the surface of the fixed platen 110 facing the movable platen 120.

The movable platen 120 is freely arranged in the mold opening and closing direction with respect to the mold clamping device frame 910. On the mold clamping device frame 910, a guide 101 is laid to guide the movable platen 120. The movable mold 820 is attached to the surface of the movable platen 120 facing the fixed platen 110.

The moving mechanism 102 moves the movable platen 120 forward and backward against the fixed platen 110 to close, pressure-boost, clamp, depressurize, and open the mold device 800. The moving mechanism 102 has a toggle support 130 spaced apart from the fixed platen 110, a tie bar 140 connecting the fixed platen 110 and the toggle support 130, a toggle mechanism 150 for moving the movable platen 120 in the mold opening and closing direction with respect to the toggle support 130, a mold clamping motor 160 for operating the toggle mechanism 150, a motion conversion mechanism 170 for converting the rotational motion of the mold clamping motor 160 into linear motion, and a mold thickness adjustment mechanism 180 for adjusting the spacing between the fixed platen 110 and the toggle support 130.

The toggle support 130 is spaced from the fixed platen 110 and mounted on the mold clamping device frame 910 so as to move freely in the mold opening and closing direction. The toggle support 130 may be movably arranged along a guide laid on the mold clamping device frame 910. The guide of the toggle support 130 may be the same as the guide 101 of the movable platen 120.

In the present embodiment, the fixed platen 110 is fixed to the mold clamping device frame 910 and the toggle support 130 is arranged freely in the mold opening and closing direction with respect to the mold clamping device frame 910, but the toggle support 130 may be fixed to the mold clamping device frame 910 and the fixed platen 110 may be arranged freely in the mold opening and closing direction with respect to the mold clamping device frame 910.

The tie bar 140 connects the fixed platen 110 and the toggle support 130 with an interval L in the mold opening and closing direction. Multiple tie bars 140 (for example, 4) may be used. The multiple tie bars 140 are arranged parallel to the mold opening and closing direction and extend according to the clamp force. At least one tie bar 140 may be provided with a tie bar strain detector 141 that detects strain in the tie bar 140. The tie bar strain detector 141 sends a signal indicating its detection result to the controller 700. The detection result of the tie bar strain detector 141 is used for the detection of clamp force or the like.

In the present embodiment, the tie bar strain detector 141 is used as the mold clamping force detector for detecting the clamp force, but the present invention is not limited to this. The clamping force detector is not limited to the strain gauge type, but may be piezoelectric, capacitive, hydraulic, electromagnetic, or the like, and its mounting position is not limited to the tie bar 140.

A toggle mechanism 150 is positioned between the movable platen 120 and the toggle support 130 to move the movable platen 120 relative to the toggle support 130 in the mold opening and closing direction. The toggle mechanism 150 has a crosshead 151 that moves in the mold opening and closing direction and a pair of link groups that bend and stretch by the movement of the crosshead 151. The pair of link groups have, respectively, a first link 152 and a second link 153 flexibly connected by pins or the like. The first link 152 is swingably attached to the movable platen 120 by a pin or the like. The second link 153 is swingably attached to the toggle support 130 by a pin or the like. The second link 153 is attached to the crosshead 151 via the third link 154. When the crosshead 151 is moved forward and backward against the toggle support 130, the first link 152 and the second link 153 are bent and stretched, and the movable platen 120 moves forward and backward against the toggle support 130.

The configuration of the toggle mechanism 150 is not limited to the configuration illustrated in FIGS. 1 and 2. For example, in FIGS. 1 and 2, the number of nodes in each link group is 5, but it may be 4, and one end of the third link 154 may be connected to the nodes of the first link 152 and the second link 153.

A mold clamping motor 160 is attached to the toggle support 130 to operate the toggle mechanism 150. The mold clamping motor 160 bends and stretches the first link 152 and the second link 153 by moving the crosshead 151 forward and backward against the toggle support 130, and moves the movable platen 120 forward and backward against the toggle support 130. The mold clamping motor 160 is directly connected to the motion conversion mechanism 170, but may be connected to the motion conversion mechanism 170 via a belt, pulley, and the like.

The motion conversion mechanism 170 converts the rotational motion of the mold clamping motor 160 into the linear motion of the crosshead 151. The motion conversion mechanism 170 includes a screw shaft and a screw nut that screws into the screw shaft. A ball or roller may be interposed between the screw shaft and the screw nut.

The mold clamping device 100 performs a mold closing process, a pressure-boosting process, a mold clamping process, a depressurizing process, a mold opening process, and the like under the control of the controller 700.

In the mold closing process, the mold clamping motor 160 is driven to move the crosshead 151 forward to the mold closing completion position at a set moving velocity, thereby forwarding the movable platen 120 and touching the movable mold 820 to the fixed mold 810. The position and moving velocity of the crosshead 151 are detected using, for example, a mold clamping motor encoder 161. The mold clamping motor encoder 161 detects the rotation of the mold clamping motor 160 and sends a signal indicating the result of the detection to the controller 700.

The crosshead position detector for detecting the position of the crosshead 151 and the crosshead moving velocity detector for detecting the moving velocity of the crosshead 151 are not limited to the mold clamping motor encoder 161, but general position detectors can be used. The movable platen position detector for detecting the position of the movable platen 120 and the movable platen moving velocity detector for detecting the moving velocity of the movable platen 120 are not limited to the mold clamping motor encoder 161, and general velocity detectors can be used.

In the pressure-boosting process, the mold clamping force is generated by further driving the mold clamping motor 160 to further move the crosshead 151 forward from the mold closing clamping position to the mold open clamping position.

In the mold clamping process, the mold clamping motor 160 is driven to maintain the position of the crosshead 151 in the mold clamping position. In the mold clamping process, the mold clamping force generated in the pressure-boosting process is maintained. In the mold clamping process, a cavity space 801 (see FIG. 2) is formed between the movable mold 820 and the fixed mold 810, and an injection device 300 fills the cavity space 801 with a liquid molding material. The filled molding material is solidified, resulting in a molded product.

The number of cavity spaces 801 may be one or more. In the latter case, several molded products are obtained simultaneously. An insert material may be placed in one part of the cavity space 801 and the other part of the cavity space 801 may be filled with a molding material. A molded product is obtained in which the insert material and the molding material are integrated.

In the depressurization process, the mold clamping motor 160 is driven to move the crosshead 151 backward from the mold closing clamping position to the mold opening starting position, thereby moving the movable platen 120 backward and reducing the mold clamping force. The mold opening start position and the mold closing completion position may be the same position.

In the mold opening process, the mold clamping motor 160 is driven to move the crosshead 151 backward from the mold opening start position to the mold opening completion position at a set moving velocity, thereby moving the movable platen 120 backward and separating the movable mold 820 from the fixed mold 810. An ejector device 200 then ejects the molded product from the movable mold 820.

The setting conditions in the mold closing, pressure-boosting, and clamping processes are collectively set as a series of setting conditions. For example, the moving velocity and position (includes mold closing starting position, moving velocity switching position, mold closing completion position, and mold clamping closing position) of the crosshead 151 and the mold clamping force in the mold closing and pressure-boosting processes are collectively set as a series of setting conditions. The mold closing starting position, the moving velocity switching position, the mold closing completion position, and the mold clamping position are arranged in this order from the rear side to the front side and represent the start and end points of the section where the moving velocity is set. For each section, a moving velocity is set. The moving velocity switching position may be one or more. The moving velocity switching position need not be set. Only one of the mold clamping position and the mold clamping force may be set.

Setting conditions in the depressurization process and mold opening process are similarly set. For example, the moving velocity and position (mold opening start position, moving velocity switching position, and mold opening completion position) of the crosshead 151 in the depressurization and mold opening processes are collectively set as a series of setting conditions. The mold opening start position, the moving velocity switching position, and the mold opening completion position are arranged in this order from the front to the rear and represent the start and end points of the section where the moving velocity is set. For each section, a moving velocity is set. The moving velocity switching position may be one or more. The moving velocity switching position need not be set. The mold opening start position and the mold closing completion position may be at the same position. The mold opening completion position and the mold closing start position may be the same.

The moving velocity and position of the movable platen 120 may be set instead of the moving velocity and position of the crosshead 151. The mold clamping force may also be set instead of the position of the crosshead (for example, mold clamping position) or the position of the movable platen.

The toggle mechanism 150 amplifies the driving force of the mold clamping motor 160 and transmits the force to the movable platen 120. That amplification factor is also called toggle magnification. The toggle magnification varies according to the angle θ (hereinafter also referred to as "link angle θ") formed by the first link 152 and the second link 153. The link angle θ is obtained from the position of the crosshead 151. The toggle magnification is maximum when the link angle θ is 180 degrees.

When the thickness of the mold device 800 changes due to the replacement of the mold device 800 or a change in the temperature of the mold device 800, the mold thickness is adjusted so that a prescribed clamping force is obtained when the mold is clamped. In mold thickness adjustment, the interval L between the fixed platen 110 and the toggle support 130 is adjusted so that the link angle θ of the toggle mechanism 150 becomes a predetermined angle at the time of mold touch, for example, when the movable mold 820 touches the fixed mold 810.

The mold clamping device 100 has a mold thickness adjustment mechanism 180. The mold thickness adjustment mechanism 180 adjusts the interval L between the fixed platen 110 and the toggle support 130 to adjust the mold thickness. The timing of the mold thickness adjustment is performed, for example, between the end of the molding cycle and the start of the next molding cycle. The mold thickness adjustment mechanism 180 has, for example, a screw shaft 181 formed at the rear end of the tie bar 140, a screw nut 182 held rotatably and non-movably in the forward and backward direction by the toggle support 130, and a mold thickness adjustment motor 183 for rotating the screw nut 182 screwed to the screw shaft 181.

The screw shaft 181 and the screw nut 182 are provided for each tie bar 140. The rotary driving force of the mold thickness adjustment motor 183 may be transmitted to the multiple screw nuts 182 via the rotary driving force transmission part 185. Multiple screw nuts 182 can be rotated synchronously. The multiple screw nuts 182 can be rotated individually by changing the transmission path of the rotary driving force transmission part 185.

The rotary driving force transmission part 185 is configured by, for example, gears. In this case, a driven gear is formed on the outer circumference of each screw nut 182, a driving gear is attached to the output shaft of the mold thickness adjustment motor 183, and a plurality of driven gears and an intermediate gear meshing with the driving gear are held rotatably at the center of the toggle support 130. The rotary driving force transmission part 185 may be configured by a belt, pulley or the like instead of a gear.

The operation of the mold thickness adjustment mechanism 180 is controlled by the controller 700. The controller 700 drives the mold thickness adjustment motor 183 to rotate the screw nut 182. As a result, the position of the toggle support 130 with respect to the tie bar 140 is adjusted and the interval L between the fixed platen 110 and the toggle support 130 is adjusted. A combination of multiple mold thickness adjustment mechanisms may be used.

The interval L is detected using the mold thickness adjustment motor encoder 184. The mold thickness adjustment motor encoder 184 detects the amount and direction of rotation of the mold thickness adjustment motor 183 and sends a signal indicating the result of the detection to the controller 700. The detection result of the mold thickness adjustment motor encoder 184 is used to monitor and control the position and interval L of the toggle support 130. The toggle support position detector for detecting the position of the toggle support 130 and the interval detector for detecting the interval L are not limited to the mold thickness adjustment motor encoder 184, and a general detector can be used.

The mold clamping device 100 may have a mold temperature controller to regulate the temperature of the mold device 800. The mold device 800 has a flow path of the temperature control medium inside. The mold temperature controller adjusts the temperature of the mold device 800 by adjusting the temperature of the temperature control medium supplied to the flow path of the mold device 800.

The mold clamping device 100 of the present embodiment is a horizontal type with the mold opening and closing direction in the horizontal direction, but it may be a vertical type with the mold opening and closing direction in the vertical direction.

The mold clamping device 100 in the present embodiment has the mold clamping motor 160 as a driving part. A hydraulic cylinder may be included instead of the mold clamping motor 160. The mold clamping device 100 may also have a linear motor for opening and closing the mold, and may include an electromagnet for clamping.

(Ejector Device)

In the description of the ejector device 200, as in the description of the mold clamping device 100, the moving direction of the movable platen 120 when the mold is closed (for example, the positive X-axis direction) is described as forward, and the moving direction of the movable platen 120 when the mold is opened (for example, the negative X-axis direction) is described as backward.

The ejector device 200 is attached to the movable platen 120 and moves back and forth with the movable platen 120. The ejector device 200 has an ejector rod 210 that ejects the molded product from the mold device 800 and a drive mechanism 220 that moves the ejector rod 210 in the moving direction (X-axis direction) of the movable platen 120.

The ejector rod 210 is disposed so as to move backward and forward in a through hole of the movable platen 120. The front end of the ejector rod 210 contacts an ejector plate 826 of the movable mold 820. The front end of the ejector rod 210 may or may not be connected to the ejector plate 826.

The drive mechanism 220 has, for example, an ejector motor and a motion conversion mechanism that converts the rotational motion of the ejector motor into the linear motion of the ejector rod 210. The motion conversion mechanism includes a screw shaft and a screw nut that screws into the screw shaft. A ball or roller may be interposed between the screw shaft and the screw nut.

The ejector device 200 performs the ejection process under the control of the controller 700. In the ejection process, the ejector plate 826 is moved forward and the molded product is ejected by moving forward the ejector rod 210 from the standby position to the ejection position at a set moving velocity. The ejector motor is then driven to move backward the ejector rod 210 at a set moving velocity and the ejector plate 826 is moved backward to its original standby position.

The position and moving velocity of the ejector rod 210 are detected using, for example, an ejector motor encoder. The ejector motor encoder detects the rotation of the ejector motor and sends a signal indicating the result of the detection to the controller 700. The ejector rod position detector for detecting the position of the ejector rod 210 and the ejector rod moving velocity detector for detecting the moving velocity of the ejector rod 210 are not limited to ejector motor encoders, and a general detector can be used.

(Injection Device)

In the description of the injection device 300, unlike the description of the mold clamping device 100 and the description of the ejector device 200, the moving direction of the screw 330 during filling (for example, the negative X-axis direction) is described as forward and the moving direction of the screw 330 during measuring (for example, the positive X-axis direction) is described as backward.

The injection device 300 is disposed on a slide base 301, and the slide base 301 is disposed freely moving forward and backward with respect to the injection device frame 920. The injection device 300 is placed freely moving forward and backward with respect to the mold device 800. The injection device 300 touches the mold device 800 and fills the cavity space 801 in the mold device 800 with the molding material. The injection device 300 has, for example, a cylinder 310 that heats the molding material, a nozzle 320 provided at the front end of the cylinder 310, a screw 330 that is placed in the cylinder 310 freely moving forward and backward and freely rotating, a measuring motor 340 that rotates the screw 330, an injection motor 350 that moves the screw 330 forward and backward, and a load detector 360 that detects the load transmitted between the injection motor 350 and the screw 330.

The cylinder 310 heats the molding material supplied inside from a feed port 311. The molding material includes, for example, resin and the like. The molding material is formed, for example, in the form of a pellet and is supplied to the feed port 311 in a solid state. The feed port 311 is formed at the rear of the cylinder 310. A cooler 312, such as a water-cooled cylinder, is provided on the outer periphery at the rear of the cylinder 310. In front of the cooler 312, a first heater 313 such as a band heater and a first temperature detector 314 are provided on the outer periphery of the cylinder 310.

The cylinder 310 is divided into multiple zones in the axial direction (for example, X-axis direction) of the cylinder 310. Each of the multiple zones is provided with the first heater 313 and the first temperature detector 314. A set temperature is set in each of the multiple zones, and the controller 700 controls the first heater 313 so that the temperature detected by the first temperature detector 314 becomes the set temperature.

A nozzle 320 is provided at the front end of the cylinder 310 and pressed against the mold device 800. The second heater 323 and a second temperature detector 324 are provided on the outer periphery of the nozzle 320. The controller 700 controls the second heater 323 so that the detection temperature of the nozzle 320 becomes the set temperature.

The screw 330 is disposed so as to be able to rotate and move in the forward and backward direction in the cylinder 310. As the screw 330 is rotated, the molding material is sent forward along the spiral groove of the screw 330. The molding material is gradually melted by heat from the cylinder 310 while being sent forward. As the liquid molding material is sent forward of the screw 330 and accumulated at the front of the cylinder 310, the screw 330 is moved backward. When the screw 330 is then moved forward, the liquid molding material accumulated in front of the screw 330 is injected from the nozzle 320 and filled into the mold device 800.

A backflow prevention ring 331 is attached to the front of the screw 330 in a retractable manner as a backflow prevention valve to prevent backflow of the molding material from the front to the rear of the screw 330 when the screw 330 is pushed forward.

As the screw 330 is moved forward, the backflow prevention ring 331 is pushed backward by the pressure of the molding material ahead of the screw 330 and retreats relative to the screw 330 to a blocking position (see FIG. 2) that blocks the flow path of the molding material. This prevents the molding material accumulated in front of the screw 330 from flowing backward.

On the other hand, when the screw 330 is rotated, the backflow prevention ring 331 is pushed forward by the pressure of the molding material sent forward along the spiral groove of the screw 330 and moved forward relatively to the screw 330 to an open position (see FIG. 1) that opens the flow path of the molding material. This sends the molding material forward of the screw 330.

The backflow prevention ring 331 may be either a co-rotating type that rotates with the screw 330 or a non-co-rotating type that does not rotate with the screw 330.

The injection device 300 may have a driving source that moves the backflow prevention ring 331 back and forth with respect to the screw 330 between the open position and the closed position.

The measuring motor 340 rotates the screw 330. The driving source for rotating the screw 330 is not limited to the measuring motor 340, but may be, for example, a hydraulic pump and the like.

The injection motor 350 moves the screw 330 back and forth. Between the injection motor 350 and the screw 330, a motion conversion mechanism is provided to convert the rotational motion of the injection motor 350 into the linear motion of the screw 330. The motion conversion mechanism has a screw shaft, for example, and a screw nut that screws into the screw shaft. A ball, roller or the like may be provided between the screw shaft and the screw nut. The driving source for moving the screw 330 forward and backward is not limited to the injection motor 350, but may be, for example, a hydraulic cylinder and the like.

The load detector 360 detects the load transmitted between the injection motor 350 and the screw 330. The detected load is converted to pressure by the controller 700. The load detector 360 is provided in the transmission path of the load between the injection motor 350 and the screw 330 to detect the load acting on the load detector 360.

The load detector 360 sends a signal of the detected load to the controller 700. The load detected by the load detector 360 is converted into the pressure acting between the screw 330 and the molding material and is used to control and monitor the pressure the screw 330 receives from the molding material, the back pressure against the screw 330, and the pressure acting on the molding material from the screw 330.

The pressure detector for detecting the pressure of the molding material is not limited to the load detector 360, but a general detector can be used. For example, a nozzle pressure sensor or an in-mold pressure sensor may be used. The nozzle pressure sensor is installed in the nozzle 320. The in-mold pressure sensor is installed inside the mold device 800.

The injection device 300 performs a measuring process, filling process, pressure-holding process, and the like, under the control of the controller 700. The filling and pressure-holding processes may be collectively referred to as the injection process.

In the measuring process, the measuring motor 340 is driven to rotate the screw 330 at a set rotational velocity and feed the molding material forward along the spiral groove of the screw 330. According to this, the molding material is gradually melted. As the liquid molding material is sent forward of the screw 330 and accumulated at the front of the cylinder 310, the screw 330 is moved backward. The rotational velocity of the screw 330 is detected using, for example, the measuring motor encoder 341. The measuring motor encoder 341 detects the rotation of the measuring motor 340 and sends a signal indicating the detection result to the controller 700. The screw-rotation velocity detector for detecting the rotation velocity of the screw 330 is not limited to the measuring motor encoder 341, and a general detector can be used.

In the measuring process, a set back pressure may be applied to the screw 330 by driving the injection motor 350 to limit the sudden backward movement of the screw 330. The back pressure against the screw 330 is detected using, for example, the load detector 360. When the screw 330 moves backward to the measuring completion position and a predetermined amount of molding material accumulates in front of the screw 330, the measuring process is completed.

The position and rotational velocity of the screw 330 in the measuring process are set together as a series of setting conditions. For example, measuring start position, rotational velocity switching position, and measuring completion position are set. These positions are arranged in this order from front to back and represent the start and end points of the section where the rotational velocity is set. For each section, a rotational velocity is set. One or more rotational velocity switching positions may be used. The rotational velocity switching position need not be set. Also, back pressure is set for each section.

In the filling process, the injection motor 350 is driven to move forward the screw 330 at a set moving velocity, and the liquid molding material accumulated in front of the screw 330 is filled into the cavity space 801 in the mold device 800. The position and moving velocity of the screw 330 are detected using, for example, the injection motor encoder 351. The injection motor encoder 351 detects the rotation of the injection motor 350 and sends a signal indicating the result of the detection to the controller 700. When the position of the screw 330 reaches the set position, switching (so-called V/P switching) from the filling process to the pressure-holding process is performed. The position where the V/P switching is performed is also called the V/P switching position. The set moving velocity of the screw 330 may be changed according to the position, time, or the like of the screw 330.

The position and moving velocity of the screw 330 in the filling process are set together as a series of setting conditions. For example, a filling start position (also called the injection start position), a moving velocity switching position, and a V/P switching position are set. These positions are arranged in this order from the rear to the front and represent the start and end points of the section in which the moving velocity is set. For each section, a moving velocity is set. The moving velocity switching position may be one or more. The moving velocity switching position need not be set.

For each section where the moving velocity of the screw 330 is set, an upper limit of the pressure of the screw 330 is set. The pressure of the screw 330 is detected by the load detector 360. If the pressure of the screw 330 is less than or equal to the set pressure, the screw 330 is moved forward at the set moving velocity. On the other hand, if the pressure of the screw 330 exceeds the set pressure, the screw 330 is moved forward at a slower moving velocity than the set moving velocity so that the pressure of the screw 330 is less than or equal to the set pressure for the purpose of mold protection.

After the position of the screw 330 reaches the V/P switching position in the filling process, the screw 330 may be temporarily stopped at the V/P switching position, and then the V/P switching may be performed. Just before the V/P switch, a slow forward or slow backward movement of the screw 330 may be performed instead of stopping the screw 330. Moreover, the screw position detector for detecting the position of the screw 330 and the screw moving velocity detector for detecting the moving velocity of the screw 330 are not limited to the injection motor encoder 351, and a general detector can be used.

In the pressure-holding process, the injection motor 350 is driven to push the screw 330 forward, keeping the pressure of the molding material at the front end of the screw 330 (hereafter, it is also called "holding pressure") at a set pressure and pushing the remaining molding material in the cylinder 310 toward the mold device 800. The missing molding material due to cooling shrinkage in the mold device 800 can be replenished. The holding pressure is detected using, for example, the load detector 360. The set value of the holding pressure may be changed according to the elapsed time from the start of the pressure-holding process and the like. The holding pressure in the pressure-holding process and the holding time for holding the holding pressure may be set multiple times, respectively, and may be set together as a series of setting conditions.

In the pressure-holding process, the molding material in the cavity space 801 in the mold device 800 is gradually cooled, and upon completion of the pressure-holding process, the inlet of the cavity space 801 is blocked by the solidified molding material. This condition is called a gate seal and prevents backflow of the molding material from the cavity space 801. After the pressure-holding process, a cooling process is initiated. The cooling process involves solidifying the molding material in the cavity space 801. The measuring process may be performed during the cooling process for the purpose of shortening the molding cycle time.

The injection device 300 of the present embodiment is an in-line screw system, but a pre-plastic system or the like may be used. The pre-plastic injection equipment supplies the injection cylinder with the molding material melted in the plasticizing cylinder, and the injection cylinder injects the molding material into the mold device. Within the plasticizing cylinder, the screw is rotatably and non-movably positioned in the forward and backward direction or the screw is rotatably and movably positioned in the forward and backward direction. On the other hand, in the injection cylinder, a plunger is placed freely moving forward and backward.

In addition, the injection device 300 of the present embodiment may be a horizontal type in which the axial direction of the cylinder 310 is horizontal, or a vertical type in which the axial direction of the cylinder 310 is vertical. The mold clamping device combined with the vertical injection device 300 may be either vertical or horizontal. Similarly, the mold clamping device combined with the horizontal injection device 300 may be either horizontal or vertical.

(Mobile Device)

In the description of the moving device 400, as in the description of the injection device 300, the moving direction of the screw 330 during filling (for example, the negative X-axis direction) is referred to as the front, and the moving direction of the screw 330 during measuring (for example, the positive X-axis direction) is referred to as the rear.

The moving device 400 moves the injection device 300 forward and backward with respect to the mold device 800. The moving device 400 also presses the nozzle 320 against the mold device 800 to produce a nozzle touch pressure. The moving device 400 includes a hydraulic pump 410, a motor 420 as a driving source, a hydraulic cylinder 430 as a hydraulic actuator and the like.

The hydraulic pump 410 has a first port 411 and a second port 412. The hydraulic pump 410 is a pump that can rotate in both directions, and by switching the rotation direction of the motor 420, hydraulic fluid (for example, oil) is taken in from one of the first port 411 and the second port 412 and discharged from the other to generate hydraulic pressure. The hydraulic pump 410 can also suck the hydraulic fluid from the tank and discharge the hydraulic fluid from either the first port 411 or the second port 412.

The motor 420 operates the hydraulic pump 410. The motor 420 drives the hydraulic pump 410 in a rotational direction and a rotational torque according to a control signal from the controller 700. The motor 420 may be an electric motor or an electric servomotor.

The hydraulic cylinder 430 has a cylinder body 431, a piston 432, and a piston rod 433. The cylinder body 431 is fixed to the injection device 300. The piston 432 divides the inside of the cylinder body 431 into a front chamber 435 as a first chamber and a rear chamber 436 as a second chamber. The piston rod 433 is fixed to the fixed platen 110.

The front chamber 435 of the hydraulic cylinder 430 is connected to the first port 411 of the hydraulic pump 410 through a first flow path 401. The hydraulic fluid discharged from the first port 411 is supplied to the front chamber 435 through the first flow path 401, and the injection device 300 is pushed forward. The injection device 300 is moved forward and the nozzle 320 is pressed against the fixed mold 810. The front chamber 435 functions as a pressure chamber that generates the nozzle touch pressure of the nozzle 320 by the pressure of the hydraulic fluid supplied from the hydraulic pump 410.

On the other hand, the rear chamber 436 of the hydraulic cylinder 430 is connected to the second port 412 of the hydraulic pump 410 through the second flow path 402. When the hydraulic fluid discharged from the second port 412 is supplied to the rear chamber 436 of the hydraulic cylinder 430 through the second flow path 402, the injection device 300 is pushed backward. The injection device 300 is moved backward and the nozzle 320 is separated from the fixed mold 810.

In the present embodiment, the moving device 400 includes a hydraulic cylinder 430, but the present invention is not limited to this. For example, instead of the hydraulic cylinder 430, an electric motor and a motion conversion mechanism that converts the rotational motion of the electric motor into the linear motion of the injection device 300 may be used.

(Controller)

The controller 700 is configured by, for example, a computer and has a Central Processing Device (CPU) 701, a storage medium 702 such as a memory, an input interface 703, and an output interface 704 as illustrated in FIGS. 1 and 2. The controller 700 performs various controls by having the CPU 701 execute the program stored in the storage medium 702. In addition, the controller 700 receives a signal from the outside at the input interface 703 and transmits a signal to the outside at the output interface 704.

The controller 700 repeatedly manufactures the molded product by repeating the measuring process, mold closing process, pressure-boosting process, clamping process, filling process, pressure-holding process, cooling process, depressurization process, mold opening process, ejection process, and the like. The sequence of operations to obtain the molded product, for example, from the beginning of the measuring process to the beginning of the next measuring process, is also called a "shot" or "molding cycle". The time required for one shot is also called the "molding cycle time" or "cycle time".

One molding cycle has, for example, the measuring process, mold closing process, pressure-boosting process, mold clamping process, filling process, pressure-holding process, cooling process, depressurizing process, mold opening process, and ejection process, in this order. The order here is the order of the start of each process. The filling process, pressure-holding process, and cooling process are performed during the clamping process. The start of the clamping process may coincide with the start of the filling process. The completion of the depressurization process coincides with the start of the mold opening process.

For the purpose of shortening the molding cycle time, multiple processes may be performed simultaneously. For example, the measuring process may be performed during the cooling process of the previous molding cycle or during the clamping process. In this case, the mold closing process may be performed at the beginning of the molding cycle. The filling process may also be started during the mold closing process. The ejection process may also be started during the mold opening process. If an on-off valve is provided to open and close the flow path of the nozzle 320, the mold opening process may be started during the measuring process. This is because even if the mold opening process is started during the measuring process, the molding material does not leak from the nozzle 320 if the on-off valve closes the flow path of the nozzle 320.

It should be noted that a single molding cycle may have processes other than the measuring process, mold closing process, pressure-boosting process, mold clamping process, filling process, pressure-holding process, cooling process, depressurizing process, mold opening process, and ejection process.

For example, after the completion of the pressure-holding process and before the start of the measuring process, a pre-measuring suck back process may be performed in which the screw 330 is moved backward to a preset measuring start position. The pressure of the molding material accumulated ahead of the screw 330 before the start of the measuring process can be reduced and the sudden backward movement of the screw 330 at the start of the measuring process can be prevented.

After the completion of the measuring process and before the start of the filling process, a post-measuring suck back process may be performed in which the screw 330 is moved backward to a preset filling start position (also called the injection start position). The pressure of the molding material accumulated ahead of the screw 330 before the start of the filling process can be reduced and the leakage of the molding material from the nozzle 320 before the start of the filling process can be prevented.

The controller 700 is connected to an operating device 750 that accepts input operations by the user and a display 760 that displays a screen. The operating device 750 and the display 760 are configured by, for example, a touch panel 770 and may be integrated. The touch panel 770 as the display 760 displays the screen under control by the controller 700. Information such as the settings of the injection molding machine 10 and the current status of the injection molding machine 10 may be displayed on the screen of the touch panel 770. Moreover, on the screen of the touch panel 770, for example, an operation part such as a button or an input column for accepting an input operation by the user may be displayed. The touch panel 770 as the operating device 750 detects an input operation on the screen by the user and outputs a signal corresponding to the input operation to the controller 700. Thus, for example, while confirming the information displayed on the screen, the user can operate the operation part provided on the screen to set the injection molding machine 10 (including input of setting values) and the like. When the user operates the operation part provided on the screen, the operation of the injection molding machine 10 corresponding to the operation part can be performed. The operation of the injection molding machine 10 may be, for example, the operation (including stopping) of the mold clamping device 100, the ejector device 200, the injection device 300, the moving device 400, and the like. In addition, the operation of the injection molding machine 10 may be such as switching the screen displayed on the touch panel 770 as the display 760.

The operating device 750 and the display 760 of the present embodiment are described as being integrated as the touch panel 770, but they may be provided independently. In addition, a plurality of operating devices 750 may be provided. The operating device 750 and the display 760 are arranged on the operating side (negative Y-axis direction) of the mold clamping device 100 (more specifically, the fixed platen 110).

(Details of Controller)

Figure 3:
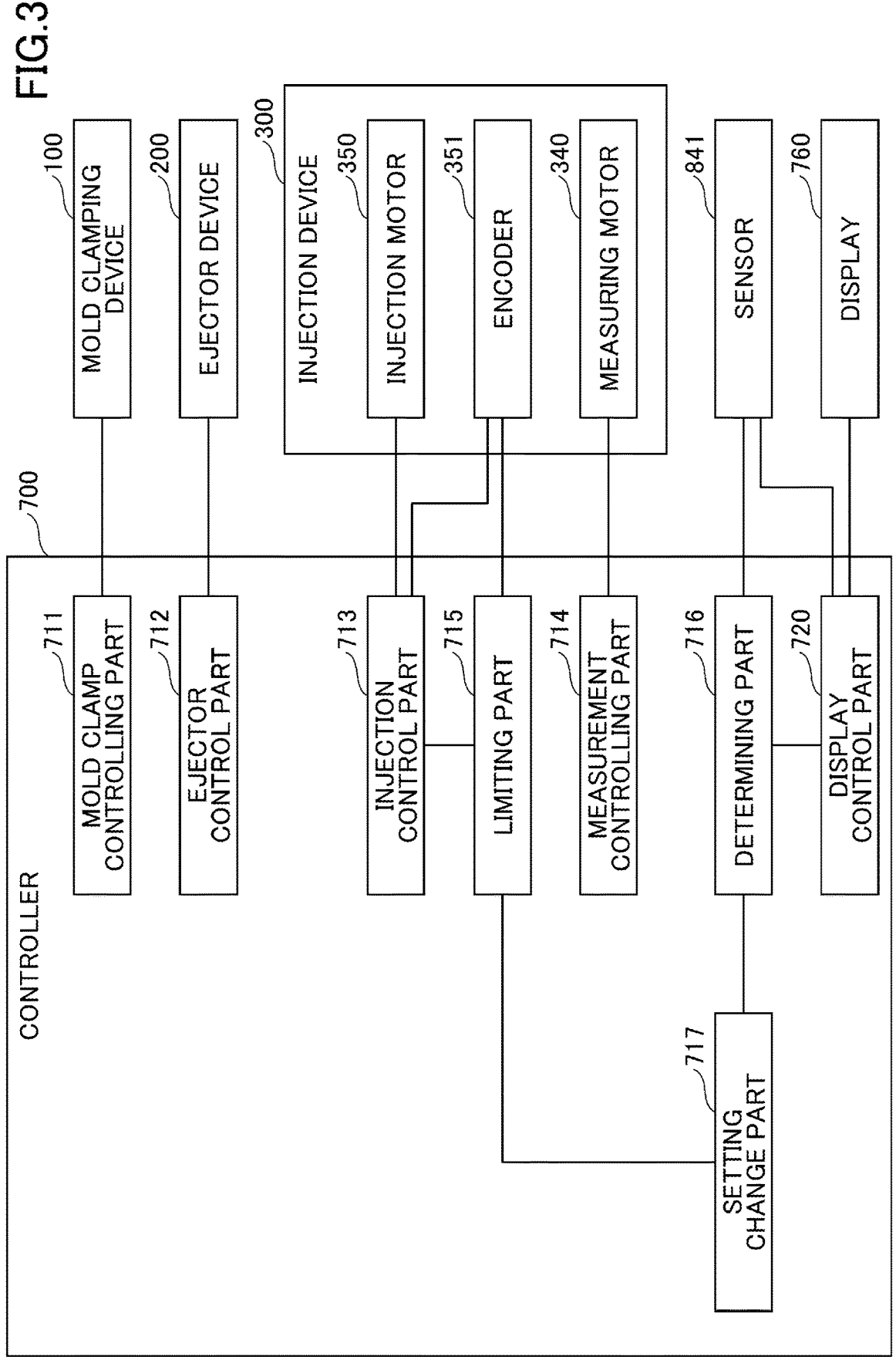
FIG. 3 is a view illustrating an example of a component of a controller in functional blocks.

An example of a component of the controller 700 will now be described with reference to FIG. 3. It should be noted that each functional block illustrated in FIG. 3 is conceptual and does not necessarily need to be physically configured as illustrated. All or part of each functional block can be functionally or physically distributed and integrated in any device. Each processing function performed in each function block may be realized in whole or in any part by a program executed in the CPU or as hardware by wired logic.

Figure 4:
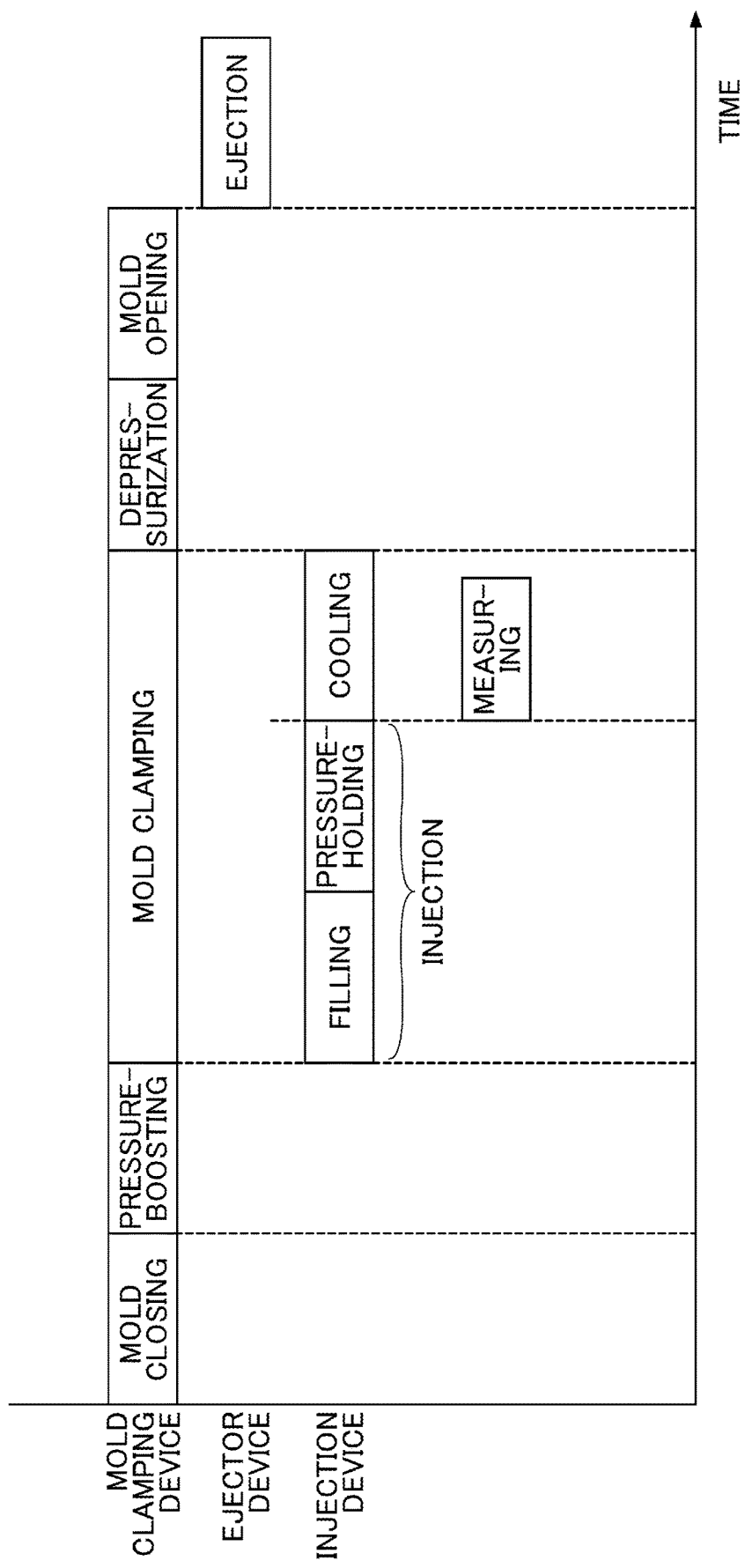
FIG. 4 is a view illustrating an example of a process of a forming cycle.

As illustrated in FIG. 3, the controller 700 includes, for example, a mold clamp controlling part 711, an ejector controlling part 712, an injection controlling part 713, and a measurement controlling part 714. The mold clamp controlling part 711 controls the mold clamping device 100 and performs the mold closing process, pressure-boosting process, mold clamping process, depressurization process, and mold opening process illustrated in FIG. 4. The ejector controlling part 712 controls the ejector device 200 and performs the ejection process. The injection controlling part 713 controls the injection drive source of the injection device 300 and executes the injection process. The injection drive source is, for example, the injection motor 350, but may be a hydraulic cylinder or the like. The injection process includes the filling process and pressure-holding process. The injection process is carried out during the mold clamping process. The measurement controlling part 714 controls the measuring drive source of the injection device 300 to perform the measuring process. The measuring drive source is, for example, the measuring motor 340, but may be a hydraulic pump or the like. The measuring process is carried out during the cooling process.

The filling process is the process of controlling the injection drive source so that the actual value of the moving velocity of the injection member provided inside the cylinder 310 becomes the set value. The filling process is a process in which the liquid molding material accumulated ahead of the injection member is filled inside the mold device 800 by moving the injection member forward. The injection member is, for example, the screw 330 (see FIGS. 1 and 2), but may be a plunger.

The moving velocity of the injection member is detected using a velocity detector. The velocity detector is, for example, the injection motor encoder 351. In the filling process, as the injection member moves forward, the pressure acting on the molding material from the injection member (hereafter, it is also called "filling pressure") increases. The filling process may include pausing the injection member or moving the injection member backward immediately before the pressure-holding process.

The pressure-holding process is the process of controlling the injection drive source so that the actual value of the filling pressure becomes the set value. The pressure-holding process is a process in which the injection member is pushed forward to replenish the missing molding material due to cooling shrinkage in the mold device 800. Filling pressure is detected using a pressure detector, such as the load detector 360. Nozzle pressure sensors or in-mold pressure sensors may be used as the pressure detectors.

Figure 5:
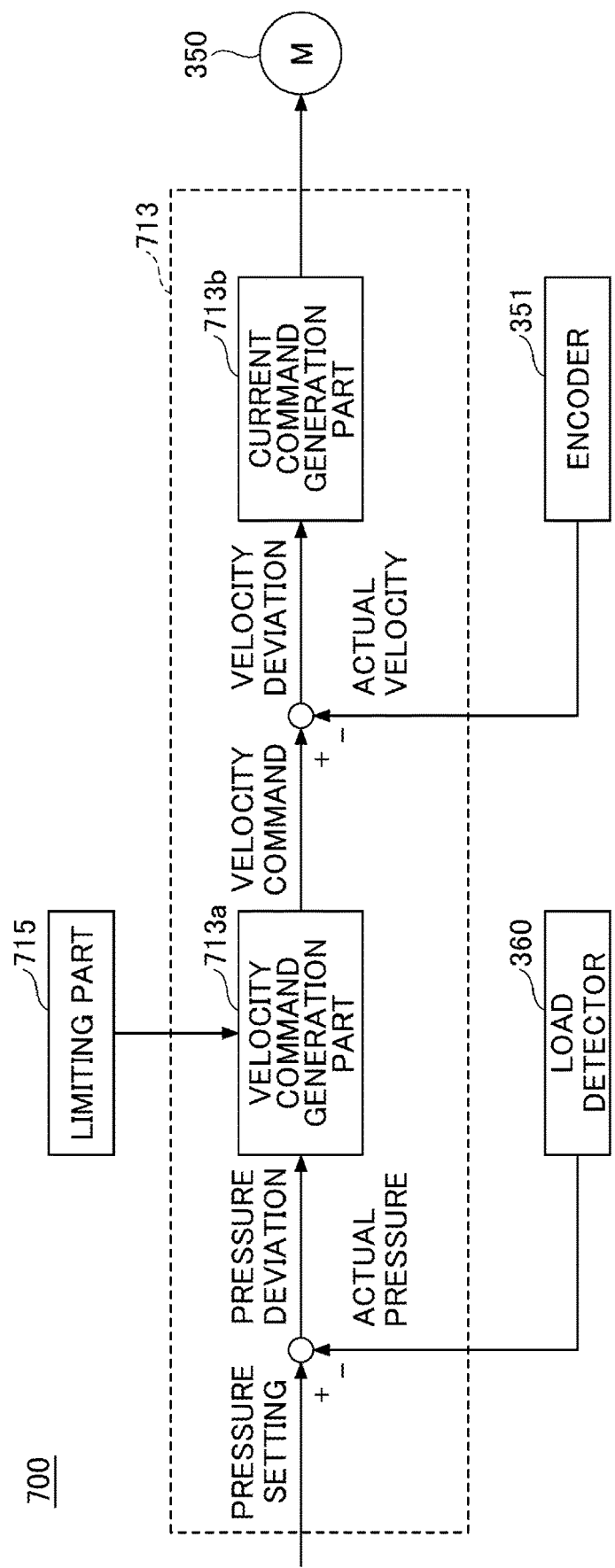
FIG. 5 is a view illustrating an example of the relationship between an injection controlling part and a limiting part.

The pressure-holding process is controlled by the injection controlling part 713. As illustrated in FIG. 5, the injection controlling part 713 includes, for example, a velocity command generation part 713a and a current command generation part 713b. The velocity command generation part 713a generates a velocity command based on the deviation between the set value of the filling pressure and the actual value. The current command generation part 713b generates a current command based on the deviation between the command value and the actual value of the forward velocity of the injection member. The injection drive source, such as the injection motor 350, is driven according to the current command.

Figure 6:
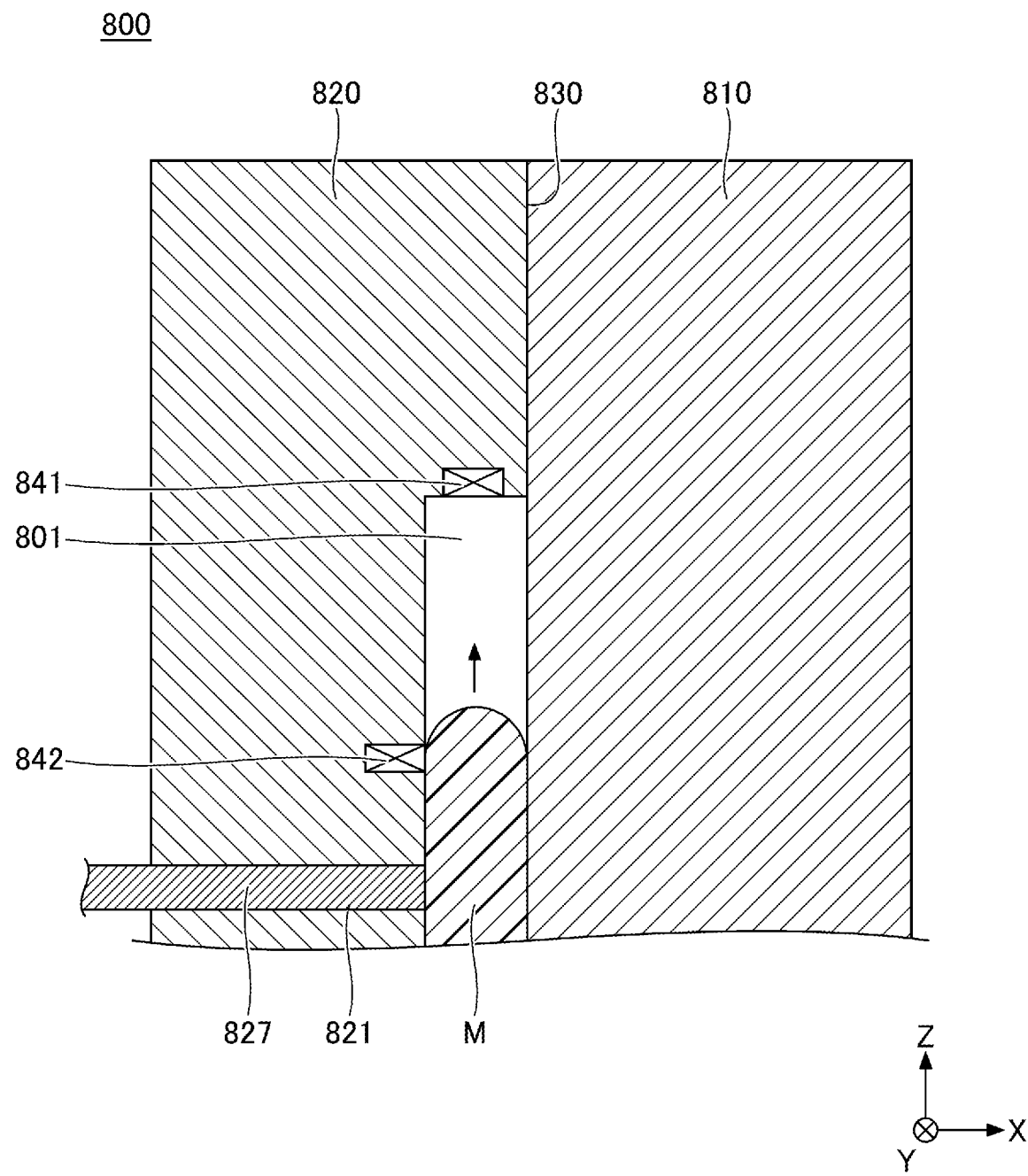
FIG. 6 is a cross-sectional view illustrating an example of a molding material flowing into an interior of a mold device.

Next, referring to FIG. 6, an example of a molding material M flowing into the inside of the mold device 800 will be described. The molding material M is, for example, a resin. The molding material M flows into the cavity space 801 inside the mold device 800. The cavity space 801 is formed on the divided surface 830 of the fixed mold 810 and the movable mold 820. The divided surface 830 is commonly referred to as the parting line.

When the molding material M flows into the cavity space 801, if the flow is rapid, the gas in the cavity space 801 does not easily escape to the outside of the mold device 800 through the divided surface 830 and the like. As a result, a defect called gas burn occurs. Gas burn is a phenomenon in which gas in the cavity space 801 is compressed and heated, carbonizing the molding material M.

When gas burn occurs, a defect called a short-circuit can also occur because the gas in the cavity space 801 does not easily escape to the outside of the mold device 800 and the gas tends to remain in the cavity space 801. The short-circuit is the phenomenon where the molding material M cools and solidifies before filling the entire cavity space 801.

The flow of the molding material M depends, for example, on the moving velocity of the injection member. The faster the forward velocity of the injection member, the faster the flow of the molding material M. In the pressure-holding process, if the actual value of the filling pressure is smaller than the set value, the injection member is moved forward so that the actual value of the filling pressure is at the set value. If the injection member is rapidly moved forward, the flow of the molding material M becomes rapid.

When the filling process is switched to the pressure-holding process (so called V/P switching), it is likely that the injection member is rapidly moved forward. At the time of V/P switching, voids usually remain in the cavity space 801. When the actual value of the filling pressure is smaller than the set value and the difference between the actual value and the set value is large at the time of V/P switching, it is likely to occur that the injection member is rapidly moved forward.

As illustrated in FIG. 3 and FIG. 5, the controller 700 includes a limiting part 715. The limiting part 715 limits the movement of the injection member forward in the pressure-holding process. The limiting part 715 limits the movement of the injection member forward in the pressure-holding process by setting an upper limit to the velocity command value generated by, for example, the velocity command generation part 713a. In the pressure-holding process, even if the actual value of the filling pressure is smaller than the set value and the difference between the actual value and the set value is large, the forward velocity of the injection member will not exceed the upper limit. As a result, gas burns can be suppressed. Additionally, not only gas burn but also the occurrence of short circuit can be suppressed.

Conventionally, the limiting part 715 sets an upper limit on the forward velocity of the injection member to suppress gas burn, but sometimes the suppression of gas burn is insufficient. This is because, for example, even if the forward velocity is below the upper limit, if the forward acceleration is large, the acceleration velocity at the flow tip of the molding material is large and the gas is easily compressed.

Therefore, the limiting part 715 of the present embodiment sets an upper limit on the forward acceleration velocity of the injection member in the pressure-holding process. The upper limit of the forward acceleration velocity of the injection member and the upper limit of the forward acceleration velocity are set separately. In the pressure-holding process, even if the actual value of the filling pressure is smaller than the set value and the difference between the actual value and the set value is large, the forward acceleration velocity of the injection member will not exceed the upper limit. As a result, gas burns can be suppressed. Additionally, not only gas burn but also the occurrence of short-circuit can be suppressed.

Although the limiting part 715 of the present embodiment sets an upper limit value for both the forward velocity and the forward acceleration velocity of the injection member in the pressure-holding process, gas burn can be suppressed in some cases by setting an upper limit value for either the forward velocity or the forward acceleration velocity. Therefore, the limiting part 715 is configured to set an upper limit of at least one of the forward velocities and forward acceleration velocity of the injection member in the pressure-holding process.

Conventionally, the setting of the forward limit of the injection member in the pressure-holding process (or more specifically, the setting of the upper limit of the forward velocity) has been done by skilled workers based on their own experience, and it is difficult for non-skilled workers to set the forward limit of the injection member.

As illustrated in FIG. 3, the controller 700 includes a determining part 716. Based on the information of the sensor 841 provided in the mold device 800, the determining part 716 determines whether the setting used by the limiting part 715 is appropriate. By using the information of the sensor 841 provided in the mold device 800, the flow state of the molding material M inside the mold device 800 can be estimated, and the appropriateness of the setting used by the limiting part 715 can be determined. This can assist in setting the forward limit of the injection member in the pressure-holding process.

The information of the sensor 841 includes at least one of, for example, the pressure, temperature, velocity, and acceleration velocity of the gas inside the mold device 800. The more abrupt the flow of the molding material M, the greater the pressure, temperature, velocity, and acceleration velocity of the gas. Therefore, from these physical quantities, the flow state of the molding material M can be estimated. The sensor 841 includes at least one of, for example, a pressure sensor, a temperature sensor, a velocity sensor, and an acceleration velocity sensor.

The pressure sensor as the sensor 841 detects the pressure of the gas. The pressure sensor is disposed at the end of the flow path of the molding material, for example. If the detected value of the pressure sensor exceeds the upper limit value, the gas compression rate inside the mold device 800 is high, and gas burn occurs, so the determining part 716 determines that the setting used by the limiting part 715 is inappropriate. On the other hand, if the detected value of the pressure sensor is less than or equal to the upper limit value, the determining part 716 determines that the setting used by the limiting part 715 is appropriate because the compression ratio of the gas inside the mold device 800 is low and gas burn does not occur.

The temperature sensor as the sensor 841 detects the temperature of the gas. The temperature sensor is disposed at the end of the flow path of the molding material, for example. If the detected value of the temperature sensor exceeds the upper limit value, the temperature of the gas inside the mold device 800 is high and gas burn occurs, so the determining part 716 determines that the setting used by the limiting part 715 is not appropriate. On the other hand, if the detected value of the temperature sensor is less than or equal to the upper limit value, the determining part 716 determines that the setting used by the limiting part 715 is appropriate because the temperature of the gas inside the mold device 800 is low and gas burn does not occur.

The velocity sensor as the sensor 841 detects the velocity of the gas. The velocity sensor is disposed, for example, near the gas passage. The gas passage is, for example, the divided surface 830 between the fixed mold 810 and the movable mold 820, or the pin hole 821 in the movable mold 820. The ejector pin 827, for example, is inserted into the pin hole 821. The ejector pin 827 is moved forward and backward together with the ejector plate 826 (see FIGS. 1 and 2) to eject the molded product in the cavity space 801.

If the detected value of the velocity sensor exceeds the upper limit value, the determining part 716 determines that the setting used by the limiting part 715 is not appropriate because the velocity of the flow tip of the molding material is high, gas is easily compressed, and gas burn occurs. On the other hand, if the detected value of the velocity sensor is less than or equal to the upper limit, the determining part 716 determines that the setting used by the limiting part 715 is appropriate because the velocity of the flow tip of the molding material is slow, the gas is not appreciably compressed, and gas burn does not occur.

The acceleration velocity sensor as the sensor 841 detects gas acceleration velocity. The acceleration velocity sensor is disposed near the gas passage, for example. If the detected value of the acceleration velocity sensor exceeds the upper limit, the determining part 716 determines that the setting used by the determining part 715 is not appropriate because the acceleration of the flow tip of the molding material is large, and gas tends to be compressed and gas burns occur. On the other hand, if the detected value of the acceleration velocity sensor is less than or equal to the upper limit, the determining part 716 determines that the setting used by the limiting part 715 is appropriate because the acceleration velocity at the flow tip of the molding material is small, the gas is not appreciably compressed, and gas burn does not occur. Acceleration velocity can also be detected by a velocity sensor.

The upper limit compared with the detected value of the sensor 841 is set for each mold device 800, for example. The setting of the upper limit is changeable. For example, the user manually sets the upper limit by entering a numerical value in the input field on the screen. Alternatively, the controller 700 detects the presence or absence of gas burn using the image of the molded product and automatically sets the upper limit based on the detection result.

The sensor 841 acquires the above information at a preset acquisition timing. The acquisition timing is set by, for example, the elapsed time from the start of the filling process or the elapsed time from the start of the pressure-holding process. The elapsed time from the start of the pressure-holding process is equal to the elapsed time from the V/P switch. When either elapsed time reaches the set time, the sensor 841 acquires the above information.

The acquisition timing may be set at the position of the flow tip of the molding material. When the flow tip of the molding material reaches the set position, the sensor 841 acquires the above information. Whether or not the flow tip of the molding material has reached the set position is detected, for example, by a presence detection sensor 842 (see FIG. 6). The presence detection sensor 842 detects the presence of the molding material at the intensity of reflected light, for example.

The acquisition timing may be set with the elapsed time from when the flow tip of the molding material reaches the set position. When the elapsed time reaches the set time, the sensor 841 acquires the above information.

As illustrated in FIG. 3, the controller 700 may have a setting change part 717. The setting change part 717 changes settings used by the limiting part 715 based on information from the sensor 841. By using the information of the sensor 841 provided in the mold device 800, the flow state of the molding material M inside the mold device 800 can be estimated, and the setting can be changed appropriately for the flow state. The limit in the forward direction of the injection member in the pressure-holding process, which was conventionally set only by an expert, can be set automatically.

The pressure sensor as the sensor 841 detects the pressure of the gas. If the detected value of the pressure sensor exceeds the upper limit value, the gas compression rate inside the mold device 800 is high and gas burn occurs, so the setting change part 717 is configured to set an upper limit of at least one of the forward velocities and forward acceleration velocity of the injection member in the pressure-holding process to be lower. The setting change amount may be a constant amount or an amount corresponding to the difference between the detected value and the upper limit value of the pressure sensor. In the latter case, the larger the difference, the larger the amount of setting change. The setting change part 717 may repeatedly change the setting until the detected value of the pressure sensor becomes less than or equal to the upper limit value.

The temperature sensor as the sensor 841 detects the temperature of the gas. When the detected value of the temperature sensor exceeds the upper limit value, the temperature of the gas inside the mold device 800 is high and gas burn occurs, so the setting change part 717 is configured to set an upper limit of at least one of the forward velocities and forward acceleration velocity of the injection member in the pressure-holding process to be lower. The setting change amount may be a constant amount or an amount corresponding to the difference between the detected value and the upper limit value of the temperature sensor. In the latter case, the larger the difference, the larger the amount of setting change. The setting change part 717 may repeatedly change the setting until the detected value of the temperature sensor becomes less than or equal to the upper limit value.

The velocity sensor as the sensor 841 detects the velocity of the gas. If the detected value of the velocity sensor exceeds the upper limit value, the setting change part 717 is configured to set an upper limit of at least one of the forward velocities and forward acceleration velocity of the injection member in the pressure-holding process to be lower; because the velocity of the flow tip of the molding material is high, gas is easily compressed and gas burn occurs. The setting change amount may be a constant amount or an amount corresponding to the difference between the detected value and the upper limit value of the velocity sensor. In the latter case, the larger the difference, the larger the amount of setting change. The setting change part 717 may repeatedly change the setting until the detected value of the velocity sensor becomes less than or equal to the upper limit value.

The accelerator velocity sensor as the sensor 841 detects gas acceleration velocity. When the detected value of the acceleration velocity sensor exceeds the upper limit value, the setting change part 717 is configured to set an upper limit of at least one of the forward velocities and forward acceleration velocity of the injection member in the pressure-holding process to be lower; because the acceleration velocity of the flow tip of the molding material is large, gas is easily compressed and gas burn occurs. The setting change amount may be a constant amount or an amount corresponding to the difference between the detected value and the upper limit value of the acceleration velocity sensor. In the latter case, the larger the difference, the larger the amount of setting change. The setting change part 717 may repeatedly change the setting until the detected value of the acceleration velocity sensor becomes less than or equal to the upper limit value.

On the basis of the information of the sensor 841 in the $n^{th}$ (n is a natural number greater than or equal to 1) molding cycle, for example, the setting change part 717 changes the setting used by the limiting part 715 in the $n+1^{st}$ and subsequent molding cycles. The occurrence of gas burn can be suppressed in $n+1^{st}$ and subsequent molding cycles. The setting change part 717 may repeatedly change the setting until the detected value of the sensor 841 falls within the desired range.

The setting change part 717 may change the setting used by the limiting part 715 in the $n^{th}$ molding cycle based on information from the sensor 841 in the $n^{th}$ molding cycle (n is a natural number greater than or equal to 1). In the $n^{th}$ molding cycle, the occurrence of gas burn can be suppressed. In other words, gas burns can be suppressed in real time. The setting change part 717 may repeatedly change the setting until the detected value of the sensor 841 falls within the desired range.

Although the setting used by the limiting part 715 is changed by the setting change part 717 in the present embodiment, the setting used by the limiting part 715 may be changed by the user. That is, although the setting is changed automatically in the present embodiment, the setting may be changed manually. When the setting is changed manually, for example, the display controlling part 720 (see FIG. 3) of the controller 700 displays the information of the sensor 841 on the display 760.

The user changes the setting used by the limiting part 715 while looking at the information of the sensor 841 displayed on the display 760, for example. The change is made by the user entering the upper limit of at least one of the forward velocities and forward acceleration velocity of the injection member in the pressure-holding process in the input field on the screen. The user may repeatedly change the setting until the detected value of the sensor 841 falls within the desired range.

The controller of the injection molding machine and the method of controlling the injection molding machine according to the present invention have been described above, but the present invention is not limited to the above examples. Various modifications, corrections, substitutions, additions, deletions, and combinations are possible within the scope described in the claims. They also naturally fall within the technical scope of the present invention.

The invention claimed is:

1. A controller of an injection molding machine in which the injection molding machine includes an injection member provided inside a cylinder to heat a molding material and an injection drive source to fill the molding material into a mold device by moving the injection member forward, the controller comprising:
processing circuitry configured to
limit a forward movement of the injection member such that a forward velocity or a forward acceleration of the injection member is limited even when an actual value of a filling pressure acting on the molding material from the injection member is smaller than a set value and a difference between the actual value and the set value is so large as to cause a rapid forward movement of the injection member, in a pressure-holding process in which the injection drive source is controlled to increase the forward velocity as the difference between the actual value and the set value increases so that the actual value becomes the set value, the pressure-holding process being performed after a filling process; and
determine an appropriateness of a setting to be used in limiting the forward movement of the injection member based on information of a sensor provided in the mold device.

2. The controller of the injection molding machine according to claim 1,
wherein the processing circuitry is configured to set an upper limit of at least one of the forward velocity and the forward acceleration of the injection member in the pressure-holding process, and to determine an appropriateness of the upper limit.

3. The controller of the injection molding machine according to claim 1,
wherein the information of the sensor includes information of at least one of a pressure, temperature, velocity, and acceleration of the gas inside the mold device.

4. The controller of the injection molding machine according to claim 1,
wherein the processing circuitry is configured to change the setting based on the information of the sensor.

5. The controller of the injection molding machine according to claim 4,
wherein the processing circuitry is configured to change the setting in $n+1^{st}$ and subsequent molding cycles based on the information of the sensor in a $n^{th}$ molding cycle, and wherein the n is a natural number greater than or equal to 1.

6. The controller of the injection molding machine according to claim 4,
wherein the processing circuitry is configured to change the setting in the $n^{th}$ molding cycle based on the information of the sensor in the $n^{th}$ molding cycle, and wherein the n is a natural number greater than or equal to 1.

7. The controller of the injection molding machine according to claim 1,
wherein the processing circuitry is configured to display the information of the sensor on a display.

8. A controller of an injection molding machine in which the injection molding machine includes an injection member provided inside a cylinder to heat a molding material and an injection drive source to fill the molding material into the mold device by moving the injection member forward, the controller comprising:
a processing circuitry configured to limit a forward acceleration of the injection member in a pressure-holding process in which the injection drive source is controlled so that an actual value of a filling pressure acting on the molding material from the injection member becomes a set value.

9. A method of controlling an injection molding machine in which the injection molding machine includes an injection member provided inside a cylinder to heat a molding material and an injection drive source to fill the molding material into a mold device by moving the injection member forward, the method comprising:
invoking a controller comprising processing circuitry configured to
limit a forward movement of the injection member such that a forward velocity or a forward acceleration of the injection member is limited even when an actual value of a filling pressure acting on the molding material from the injection member is smaller than a set value and a difference between the actual value and the set value is so large as to cause a rapid forward movement of the injection member, in a pressure-holding process in which the injection drive source is controlled to increase the forward velocity as the difference between the actual value and the set value increases so that the actual value becomes the set value, the pressure-holding process being performed after a filling process; and
determine an appropriateness of a setting to be used in limiting the forward movement of the injection member based on information of a sensor provided in the mold device.

* * * * *